US012414896B2

(12) United States Patent
Patel

(10) Patent No.: US 12,414,896 B2
(45) Date of Patent: Sep. 16, 2025

(54) EYE EXERCISING AND MONITORING METHOD

(71) Applicant: Rohan Vishnubhai Patel, Bensalem, PA (US)

(72) Inventor: Rohan Vishnubhai Patel, Bensalem, PA (US)

( * ) Notice: Subject to any disclaimer, the term of this patent is extended or adjusted under 35 U.S.C. 154(b) by 1073 days.

(21) Appl. No.: 17/121,673

(22) Filed: Dec. 14, 2020

(65) Prior Publication Data

US 2021/0177689 A1 Jun. 17, 2021

Related U.S. Application Data

(60) Provisional application No. 62/948,264, filed on Dec. 15, 2019.

(51) Int. Cl.
*A61H 5/00* (2006.01)

(52) U.S. Cl.
CPC ....... *A61H 5/00* (2013.01); *A61H 2201/5046* (2013.01); *A61H 2201/5048* (2013.01); *A61H 2201/5097* (2013.01)

(58) Field of Classification Search
CPC .......... G06F 3/013; G06F 3/011; G06F 3/017; G06F 3/04815; G06F 118/214; G06F 3/012; G06F 3/04845; G06F 3/0304; G06F 3/0481; G06F 3/1454; G06F 3/04812; G06F 3/1423; G06F 1/1694; G06F 2203/04804; G06F 3/005; G06F 3/0482; G06F 1/1626; G06F 3/048; G06F 3/04883; G06F 3/14; G06F 3/167; G06F 1/3231; G06F 3/1446; G06F 9/451; G06F 1/1686; G06F 1/3265; G06F 15/16; G06F 16/27; G06F 16/4387; G06F 16/532; G06F 16/58; G06F 18/2148; G06F 18/22; G06F 18/41; G06F 21/32; G06F 3/015; G06F 3/038; G06F 3/04847; G06F 3/0487; G06F 3/0488; G06F 1/163; G06F 1/3203; G06F 1/3243; G06F 16/90; G06F 21/31; G06F 21/604; G06F 21/6218; G06F 2221/2111; G06F 3/016; G06F 3/0416; G06F 3/0484; G06F 3/0485; G06F 3/16; G06F 3/165; G06F 1/1643; G06F 1/1647; G06F 1/1673; G06F 1/1684; G06F 1/3287; G06F 16/5854; G06F 2200/1637; G06F 2203/04104; G06F 2203/04805; G06F 2203/04806; G06F 2203/04808; G06F 2221/2113; G06F 3/014; G06F 3/033; G06F 3/0346; G06F 3/041; G06F 3/0412; G06F 3/044; G06F 3/04855; G06F 3/04886; G06F 3/1431; G06F 3/147; G06F 40/169; G06F 40/242; G06F 40/40; G06F 40/56; A61B 3/113; A61B 3/032; A61B 3/0025; A61B 3/14; A61B 3/028; A61B 2017/00216; A61B 90/37;

(Continued)

(56) References Cited

U.S. PATENT DOCUMENTS

| | | | | |
|---|---|---|---|---|
| 2012/0326945 A1* | 12/2012 | Ellis | G06F 3/1423 345/1.1 |
| 2016/0267847 A1* | 9/2016 | Chen | G09G 3/3225 |
| 2017/0018007 A1* | 1/2017 | DeFrank | G16H 50/20 |

* cited by examiner

*Primary Examiner* — Brandi N Thomas

(57) ABSTRACT

A method for an eye exercise is to exercise various eye muscles to keep them active and in better shape. The method comprises of showing two visuals to a user wherein one of the two visuals is at closer proximity than other. Allowing the user to focus on the two visuals and monitoring the user's response to assure participation in the exercise.

18 Claims, 5 Drawing Sheets

100

(58) Field of Classification Search

CPC .... A61B 2034/2048; A61B 2034/2051; A61B 2090/371; A61B 2090/372; A61B 90/361; A61B 1/00181; A61B 1/00193; A61B 1/045; A61B 2034/2055; A61B 2090/365; A61B 34/20; A61B 3/0091; A61B 3/10; A61B 1/00048; A61B 1/00006; A61B 1/000095; A61B 1/00101; A61B 1/00188; A61B 1/00194; A61B 2034/2063; A61B 2090/309; A61B 2090/363; A61B 2090/502; A61B 2576/00; A61B 3/022; A61B 90/30; A61B 1/000094; A61B 1/00042; A61B 1/00045; A61B 1/05; A61B 2017/00203; A61B 2017/00207; A61B 2090/367; A61B 3/06; A61B 3/103; A61B 3/145; A61B 34/25; A61B 5/163; A61B 3/085; A61B 3/112; A61B 2017/00115; A61B 2034/2059; A61B 2034/258; A61B 3/102; A61B 3/107; A61B 34/30; A61B 34/37; A61B 34/74; A61B 5/02438; A61B 5/165; A61B 5/398; A61B 5/6803; A61B 5/7267; A61B 90/90; A61B 17/00234; A61B 2017/00199; A61B 2017/00212; A61B 2017/00225; A61B 2017/00424; A61B 2017/00446; A61B 2017/00973; A61B 2560/0493; A61B 3/0033; A61B 3/0041; A61B 34/35; A61B 34/76; A61B 5/0024; A61B 5/0062; A61B 5/02416; A61B 5/0261; A61B 5/1103; A61B 5/16; A61B 5/375; A61B 5/378; A61B 5/38; A61B 5/389; A61B 5/4064; A61B 5/486; A61B 5/4863; A61B 5/741; A61B 5/7415; A61B 5/7435; A61B 5/744; A61B 5/7445; A61B 50/10; A61B 50/20; A61B 90/60; A61B 1/00009; A61B 1/043; A61B 17/07207; A61B 2017/00221; A61B 2017/00398; A61B 2017/00734; A61B 2017/00809; A61B 2034/105; A61B 2034/302; A61B 2034/742; A61B 2034/743; A61B 2034/744; A61B 2090/364; A61B 2090/3937; A61B 2503/20; A61B 2560/0295; A61B 2560/04; A61B 2560/0443; A61B 2560/0456; A61B 2560/0462; A61B 2560/0468; A61B 2560/0475; A61B 2562/0219; A61B 3/0008; A61B 3/005; A61B 3/1005; A61B 3/117; A61B 3/18; A61B 5/0008; A61B 5/002; A61B 5/0022; A61B 5/0066; A61B 5/0073; A61B 5/0077; A61B 5/022; A61B 5/05; A61B 5/0537; A61B 5/083; A61B 5/0833; A61B 5/087; A61B 5/097; A61B 5/1112; A61B 5/1118; A61B 5/1128; A61B 5/14532; A61B 5/1455; A61B 5/161; A61B 5/164; A61B 5/222; A61B 5/339; A61B 5/4845; A61B 5/4866; A61B 5/4872; A61B 5/6817; A61B 5/6826; A61B 5/6838; A61B 5/6896; A61B 5/6898; A61B 5/7246; A61B 5/742; A61B 7/00; A61B 90/20; A61B 90/25; A61B 90/39; A61B 90/53; G02B 27/0172; G02B 2027/014; G02B 27/017; G02B 2027/0138; G02B 2027/0178; G02B 2027/0141; G02B 2027/0187; G02B 27/0179; G02B 27/0093; G02B 2027/0123; G02B 27/00; G02B 2027/0112; G02B 2027/0118; G02B 2027/0127; G02B 27/0025; G02B 30/10; G06V 40/193; G06V 20/20; G06V 40/19; G06V 10/764; G06V 10/774; G06V 10/95; G06V 20/10; G06V 2201/03; G06V 40/165; G06V 40/172; G06V 40/197; G06V 40/20; G06V 10/145; G06V 40/18; G06V 10/143; G06V 10/255; G06V 10/28; G06V 10/40; G06V 10/454; G06V 10/82; G06V 20/44; G06V 20/46; G06V 20/69; G06V 20/698; G06V 40/16; G06V 40/166; G06V 40/171; G06V 40/28

See application file for complete search history.

EYE EXERCISING AND MONITORING METHOD

PRIORITY

The current non-provisional application claims benefit of provisional application No. 62/948,264 filed on Dec. 15, 2019.

TECHNICAL FIELD

The embodiment herein generally relates to the field of method of providing a eye enhancement exercise service, more particularly invention relates to a method for exercise & monitors human eye vision.

BACKGROUND

As we know that an eye of a human function using muscle inside it. The eye uses muscle to focus far, near and in between. The eye uses muscle to look objects in front of it or at an angle to it. The eye also has muscles to control diaphragm to control the light coming inside. During the nighttime; the diaphragm is open wide to allow maximum light in low-light conditions. During daytime the diaphragms are substantially closed to allow only sufficient light inside.

Humans receive more than 80% information by eyes. With the rapid development of science and technology, more and more percentile of population is working inside closed cubicles causing eyes to focus only at the nearby objects. Now the number of poor eyesight patients has increased to be the highest in the world.

Less eyeball movement is one of the important factors that contribute to poor eyesight. Lacking exercise and paying attention to book, computer and other objects in close quarters for a long time bring a pressure to eyes, causing the fatigue or even spasm of ciliary muscle, blurrier vision, shorter audiovisual and/or visual distance and gradually vision problems.

The state of the art is replete with various methods and techniques which exercises or techniques that can be used to provide little workout to a user's eye, help improve reading speed and reading comprehension. The existing techniques fail to teach the advantages of exercising a majority of the muscles of the eye. By strengthening eye muscle groups, the eye muscles can be kept in good and active shape, which can affect reading speed and comprehension.

Thus, there is a need to develop a method for exercise & monitor human eye vision to help overcome the above problems.

SUMMARY

A main object of the present invention is to provide a solution to the above problems.

An object of the present invention is to provide a method to increase the range of the user's current focal capability range.

The advantages of the present invention are as follows: the method makes eye muscles become more flexible, more coordination, more strong and powerful, and enhance the resilience of the environment.

Given the foregoing, a first embodiment herein describes an eye exercising and monitoring method comprises the following steps (i) employing at least two electronic screens to a user; (ii) displaying at least one audiovisual and/or visual or audiovisual and/or visual on each of the two electronic screens; (iii) providing access to a user to audiovisuals or visuals or audiovisuals or visuals on each of the at least two screens; (iv) allowing the user to focus on the audiovisuals or visuals or audiovisual and/or audiovisuals and/or visuals; (v) monitoring and processing for user response; (vi) comparing the user response to the predetermined database to confirm the user participation in the eye exercise. At least one electronic screen is located in proximity to the user. At least one electronic screen includes but not limited to a tablet, a mobile phone, a television, an electronic screen. The user's involvement is monitored using at least one monitoring device including but limited to a camera, a microphone, a touch response. The user's involvement is monitored by providing the user at least one puzzle, wherein the user needs to focus on at least one audiovisual and/or visual on each of at least two electronic screens to solve. The eye exercising method is conducted using an application and/or web-connectivity on at least one hand held electronic device. The involvement of the user is monitored and/or evaluated using an internet.

Given the foregoing, a second embodiment herein describes an eye exercising device. The steps are as follows: (i) employing at least one electronic screen to a user (ii) displaying at least two audiovisuals or visuals on the at least one electronic screen, wherein the at least two audiovisuals or visuals are displayed simultaneously and/or in-series, wherein at least one of the at least two audiovisuals or visuals is smaller (iii) allowing the user access to the at least two audiovisuals or visuals and monitoring for a response from the user. Wherein virtual reality device is used to exercise. The at least one electronic screen is an electronic screen of a portable electronic device. The user's involvement is monitored using a camera focusing on the eyes of the user. The user's involvement in the exercise is monitored by providing at least one puzzle that depends on the at least two audiovisuals or visuals (first audiovisual and/or visual=the digit 4 (smaller fonts) and $2^{nd}$ audiovisual and/or visual is the digit 5 (in bigger fonts)=user is advised to sum (or multiply or do whatever) both and answer=9) this way user's involvement in the exercise can be monitored OR First audiovisual and/or visual "DU" in smaller fonts $2^{nd}$ audiovisual and/or visual shown in bigger fonts "BAI" user supposed to evaluate the term and say "DUBAI" or click on "DUBAI" in multiple choice or provide input in any way to convey what the audiovisuals or visuals are. The exercise is conducted on a software-application and/or using web-connectivity. the involvement of the user is monitored and/or evaluated using an internet.

Given the foregoing, a Third embodiment herein describes an eye exercising method comprises i) displaying at least one audiovisual and/or visual or audiovisual and/or visual on one electronic screen, wherein a user focuses on the displayed audiovisual and/or visual or audiovisual and/or visual; ii) the user uses touch screen on the second electronic screen to provide response, wherein the response is based on the at least one audiovisual and/or visual or audiovisual and/or visual that is displayed on the first electronic screen, iii) the user response is compared to the displayed audiovisual and/or visual or audiovisual and/or visual wherein the comparison confirms the user participation in the eye exercise. Device. The user's involvement is monitored by providing a puzzle and monitoring for the user's response solving the puzzle to determine the user's participation in focusing at both the electronic screens.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. The common steps in all three embodiments is making the user focus on at least two screens, receiving and processing the response to assure the user's active participation in the eye exercising method. The steps of each of the three embodiments can be repeated multiple times so the user can conduct the exercises for a longer duration of time.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Every screen mentioned here is an electronic screen and/or display and/or screen and/or projection screen.

The embodiments herein achieve this by providing a method for exercising various eye muscles & monitor human participation.

Figure 1:
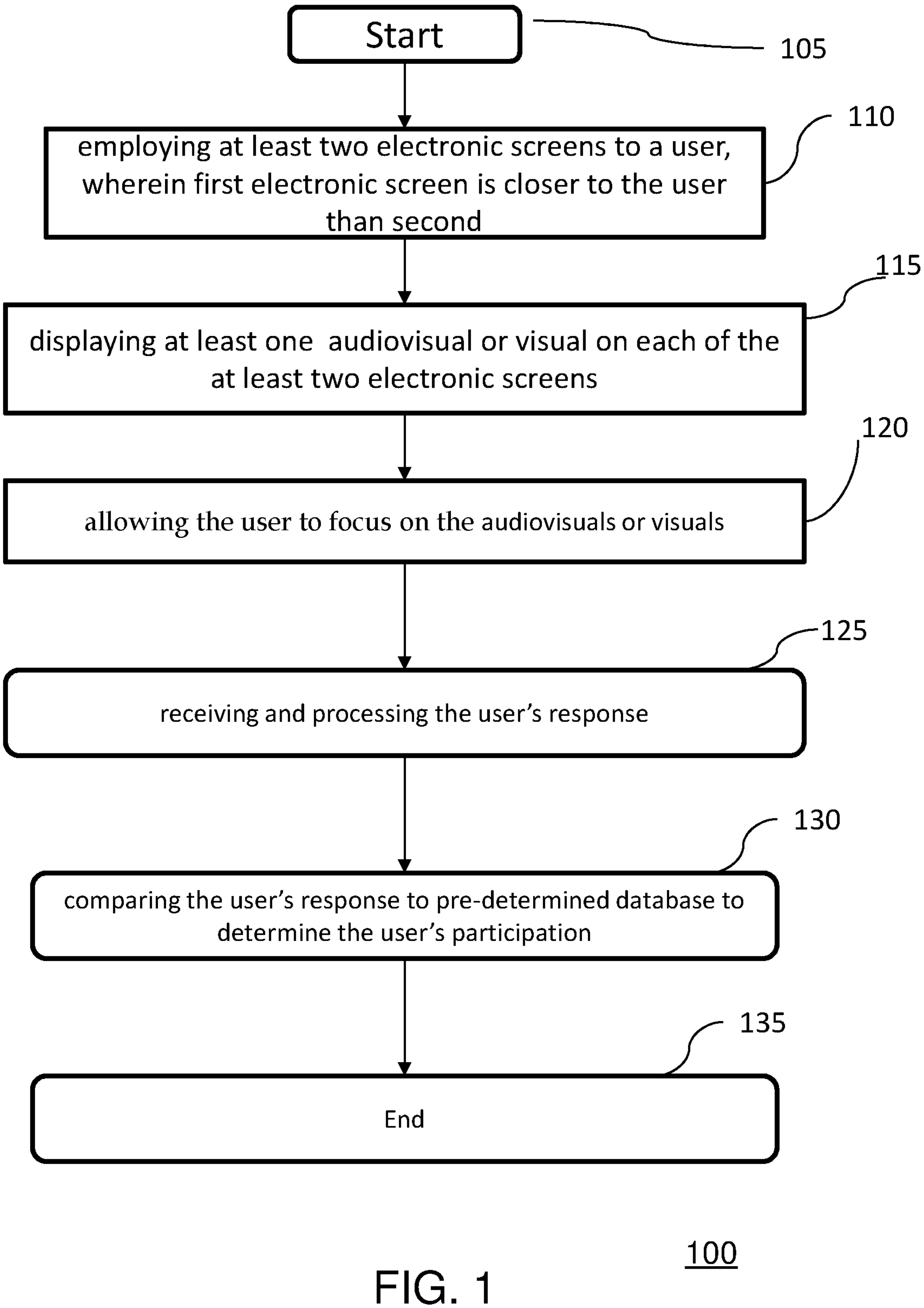
FIG. 1 illustrates an eye exercising method displaying one audiovisual and/or visual on each of the two electronic screens, in accordance with an embodiment of the present invention.

FIG. 1 illustrates an eye exercising method displaying one audiovisual and/or visual on each of two screens, in accordance with an embodiment of the present invention. An eye exercising method comprises the following steps: (i) step 110: employing at least two electronic screens to a user, wherein first electronic screen is closer to the user than second electronic screen; (ii) step 115: displaying at least one audiovisual and/or visual on each of the at least two electronic screens, wherein the user is given instructions which can be verbal or within the audiovisual or visual on each of the two screens; (iii) step 115: allowing a user access on each of the one audiovisual and/or visual displayed on each of the at least two screen to the user; (iv) step 120: allowing the user to focus on the at least one audiovisual and/or visual on each of the at least two electronic screens. (v) the user responds after focusing on each of the two screens and/or after focusing on both the screens, wherein the user response is based on the instructions given to the user. (vi) step 125: receiving the user's response using touch screen, microphone webcam and processing to confirm the user's participation in focusing at each of the two audiovisuals or visuals. (vii) step 130: comparing the user's response to pre-determined database to determine the user's participation, focusing at the respective electronic screens, wherein the toggling operations focusing on the respective screens, exercises the user's eye muscles. The method of exercise forces the user focus on near and far visuals which helps exercise eye's focal, eye ball movement and diaphragm muscles. Wherein the exercise can help improve eyesight by the device that shows some audiovisuals or visuals on a small screen on first screen in a small font and other audiovisuals or visuals on second screen far in a small letter. The instructions can be given with every time the steps repeats or in once which then will be anticipated to be followed by the user for each of the repeat cycles. The user focuses on the audiovisual or visual displayed on the first screen and the second screen; the user focuses on two different screens that are set at different proximities from the user or have different font sizes or zoom ratio which forces the user's eye muscles work in order of focus on each of the two screens, which ends up exercising user's eye's focal muscles, eye ball movement muscles, eye lid muscles and with different intensity of contrast and or brightness between the two screens, the diaphragm muscles of the user's eye also gets work out.

In an embodiment, two screens are provided, for example a plurality of phrases or sentences having smaller font size are displayed in predetermined units on first screen, and the plurality of phrases or sentences having smaller letters are displayed in a predetermined range on the second screen.

Figure 2:
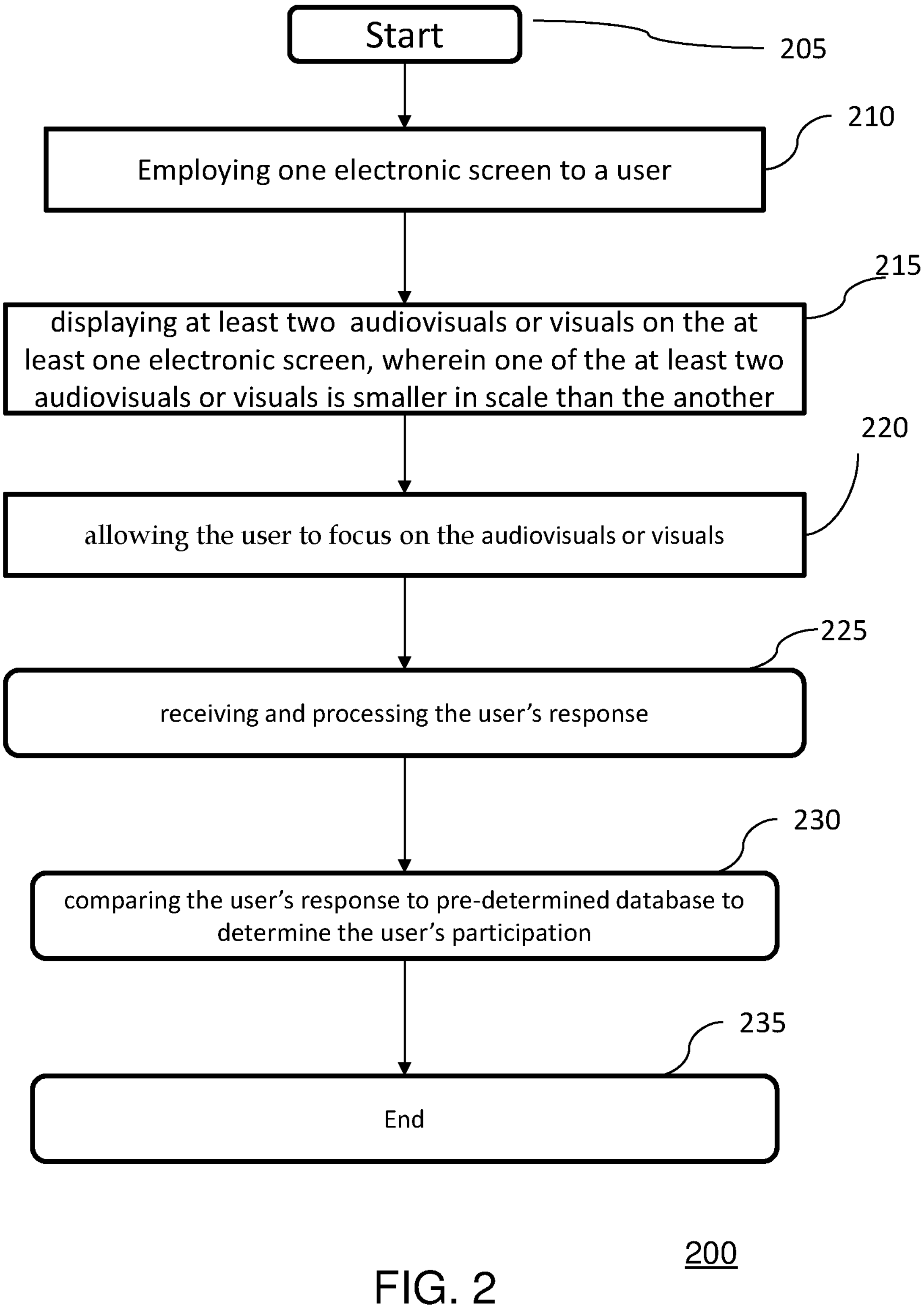
FIG. 2 illustrates an eye exercising method displaying two audiovisuals or visuals of different scales on the same screen, in accordance with an embodiment of the present invention.

FIG. 2 illustrates an eye exercising method displaying two audiovisuals or visuals on one screen, in accordance with an embodiment of the present invention. An eye exercising device. The steps are as follows: (i) step 210: employing at least one electronic screen to a user (ii) step 215: displaying at least two audiovisuals or visuals on the at least one electronic screen, wherein the at least two audiovisuals or visuals are displayed simultaneously and/or in-series, wherein at least one of the at least two audiovisuals or visuals is smaller in scale than the another (iii) step 220: providing the user access to the respective audiovisuals or visuals, wherein the user toggles between the respective audiovisuals or visuals to focus, (iv) step 225: receiving and processing the user's response to interrogation with at least one of the respective audiovisuals or visuals to generate a result, wherein the result generated is based on instructions associated with at least one of the at least two audiovisuals or visuals; (v) step 230: comparing the user's response to pre-determined configuration to determine the user's participation, focusing on the respective audiovisuals or visuals, wherein toggling operations to focus the respective screens exercises the user's eye muscles. The user focuses on the first audiovisual or visual displayed on the one screen and then focuses on the second audiovisual or visual on the same one screen wherein focusing on the two audiovisuals or visual with different scale or zoom ratio or font sizes the user's eye muscles to work in order of focus on each of the two audiovisuals or visuals, which ends up exercising user's eye's focal muscles, eye ball movement muscles, eye lid muscles and with different intensity of contrast and or brightness between the two screens, the diaphragm muscles of the user's eye also gets work out.

Figure 3:
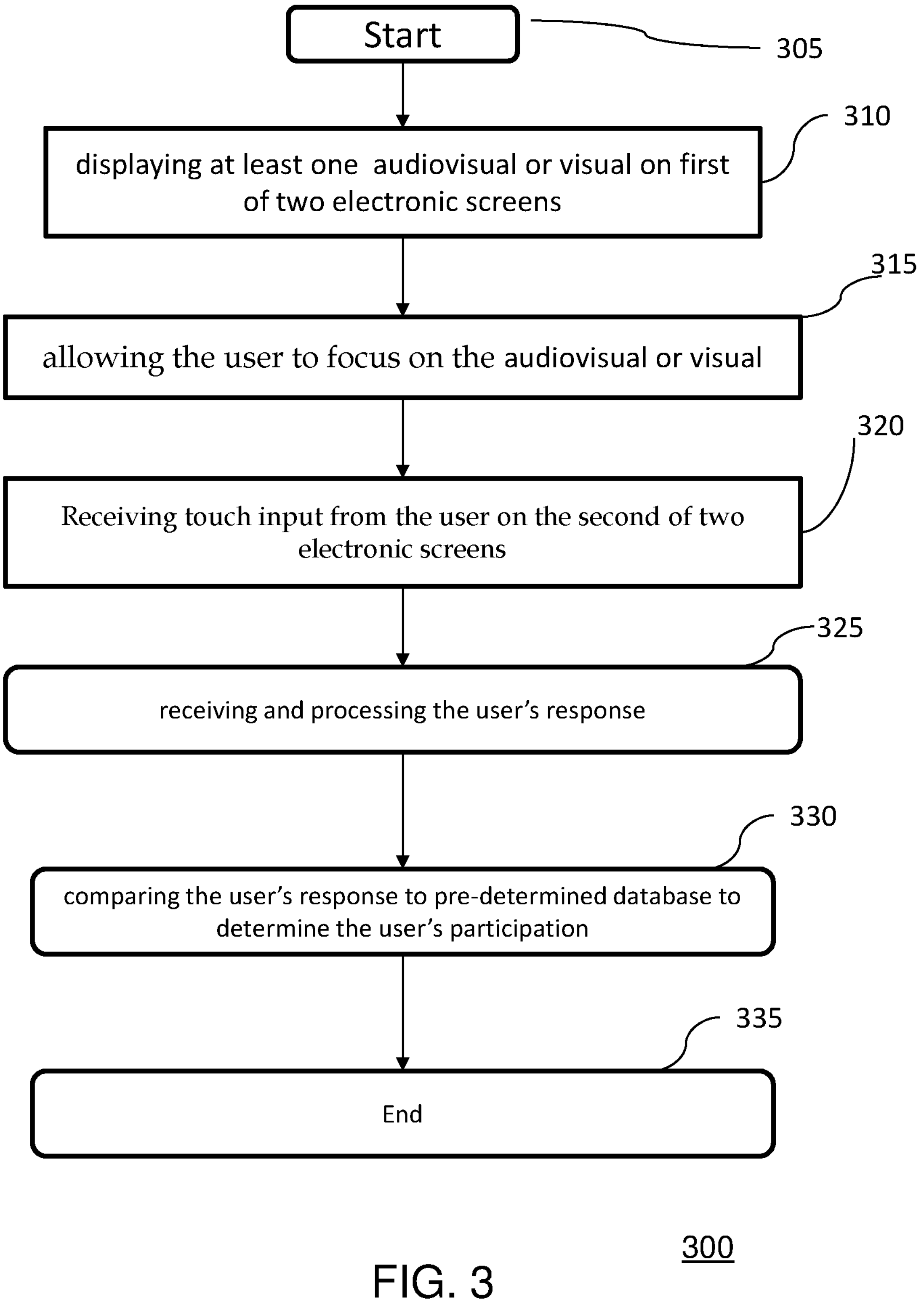
FIG. 3 illustrates an eye exercising method displaying at least one audiovisual and/or visual on a first screen and receiving a touch input from a second electronic screen.

FIG. 3 illustrates an eye exercising method displaying one audiovisuals or visuals on one screen, and allowing a user to provide response on the second screen with touch input capability, in accordance with an embodiment of the present invention. An eye exercising device. The steps are as follows: (i) employing at least one electronic screen to a user (ii) step 310: displaying at least one audiovisual or visual on the at least one electronic screen, (iii) step 315: providing the user access to the respective audiovisuals or visuals, wherein the user focusing at the audiovisual or visual on the first electronic screen and toggles at the second screen to provide a touch input (step 320) wherein the response is based on the audiovisual or visual displayed on the first electronic screen, (iv) step 325: receiving and processing the user's response to interrogation with at least one of the respective audiovisuals or visuals to generate a result, wherein the result generated is based on instructions associated with at least one of the at least two audiovisuals or visuals; (v) step 330: comparing the user's response to pre-determined configuration to determine the user's participation, focusing on the respective audiovisuals or visuals, wherein toggling operations to focus the respective screens exercises the user's eye muscles. In this third embodiment of the eye exercising method, the user focuses on the audiovisual or visual displayed on the first screen and then focuses on the second screen to provide touch response; the user focuses on two different screens that are set at different proximities from the user or have different font sizes or zoom ratio which forces the user's eye muscles work in order of focus on each of the two screens, which ends up exercising user's eye's focal muscles, eye ball movement muscles, eye lid muscles and with different intensity of contrast and or brightness between the two screens, the diaphragm muscles of the user's eye also gets work out.

Figure 4:
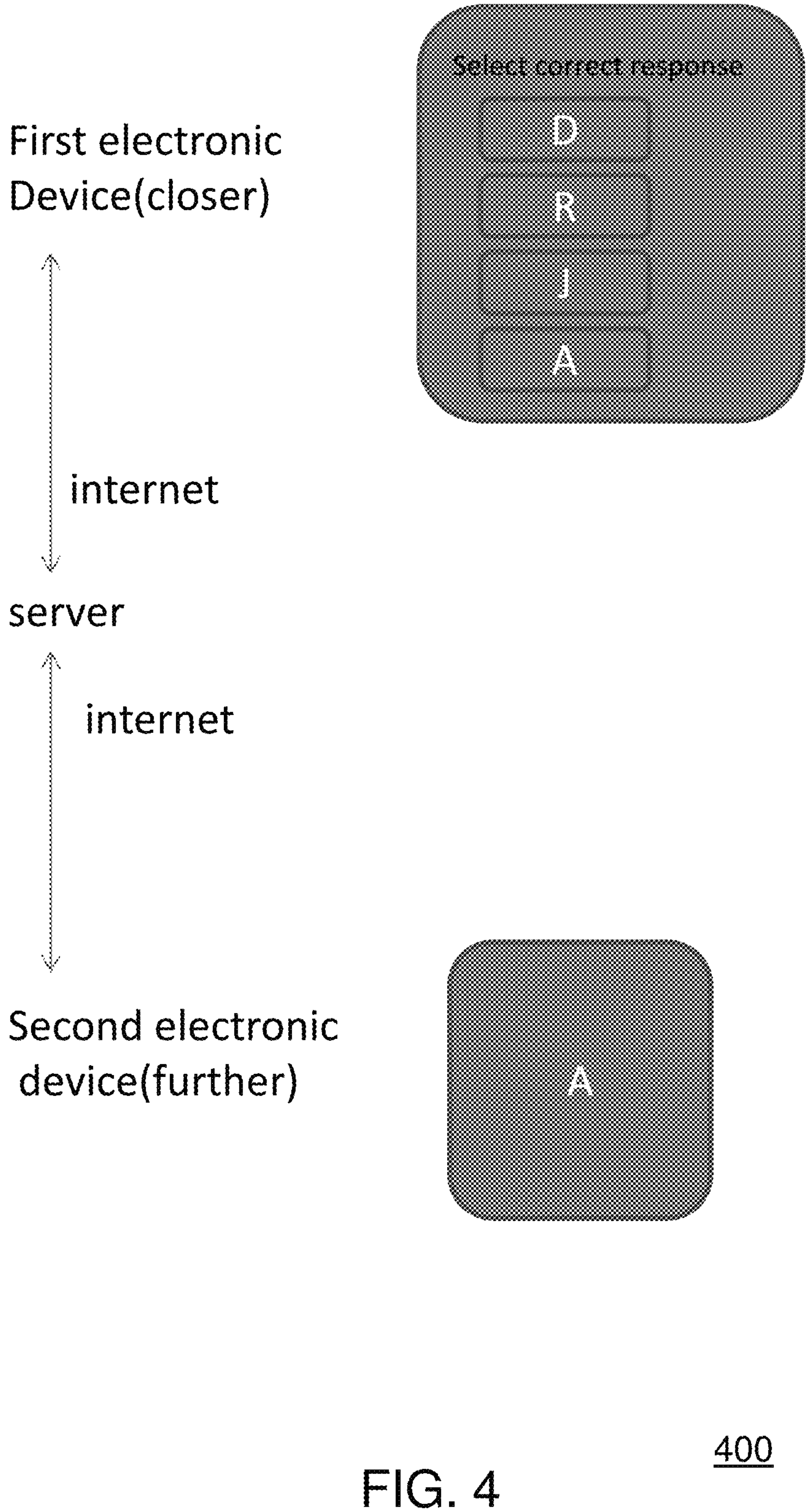
FIG. 4 and FIG. 5 illustrate an eye exercising method displaying pairing of a first electronic device to a server via internet and a second electronic device linked to the server via internet.
Figure 5:
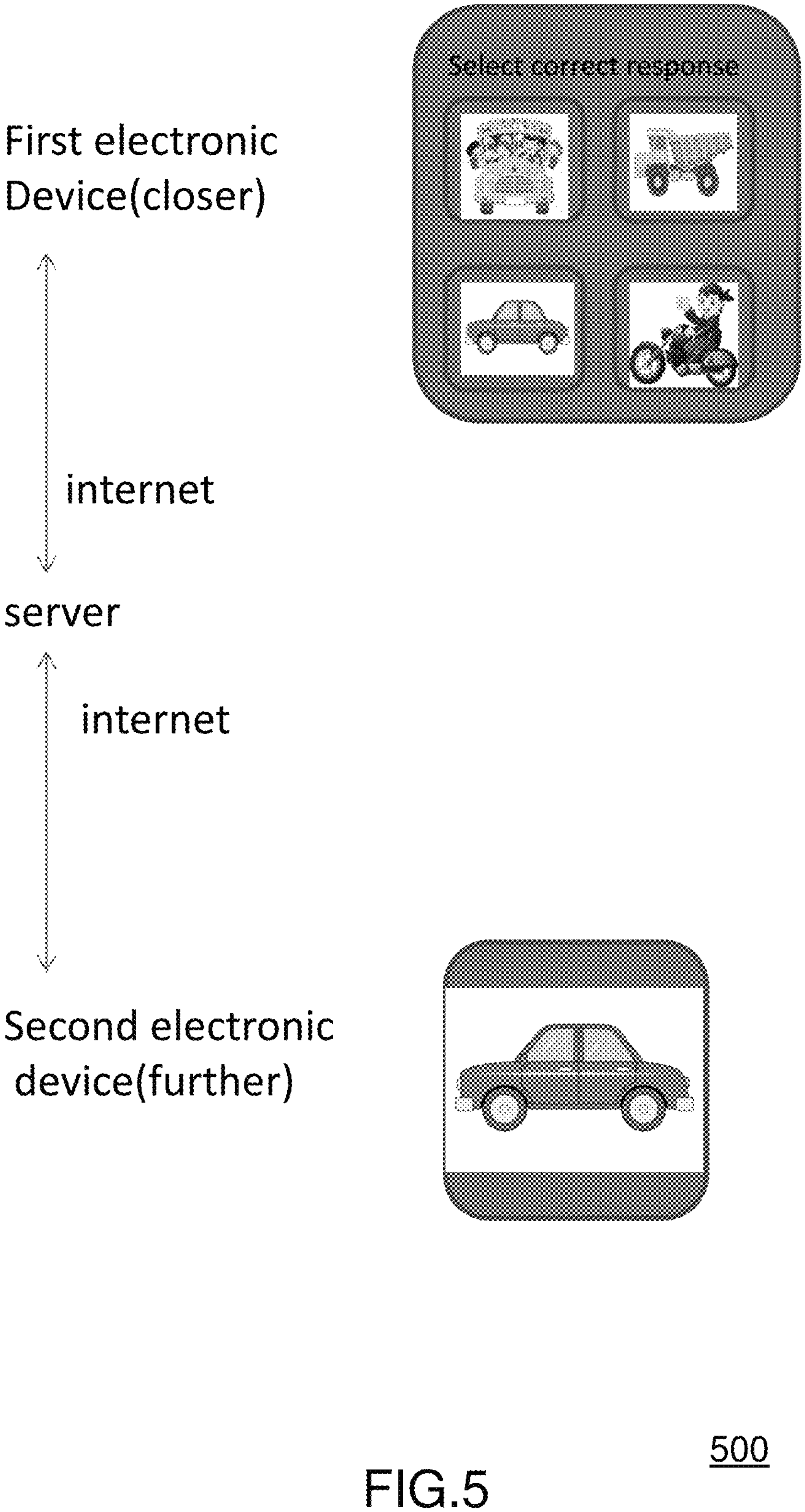

FIG. 4 and FIG. 5 illustrate embodiments of this invention where the first electronic device, the second electronic device and the server are connected via internet. The server acts as a medium between the first electronic device and the second electronic device and distributes an audio visual or visual and to assure user participation. The first electronic device and the second electronic device also can be linked directly with one another wirelessly and have one or two device acts as a server. Concept here is to force the user focus on one device and another which forces the user's eyes to focus to at least two distinct focal lengths.

In an embodiment of the present invention, display screens are provided for displaying audiovisual and/or visual content to the user and a control system is provided to control the operation of the device and its components to facilitate treatment of the vision of the user. The devise is designed to identify different focal capabilities of the user and using the focus range and providing continuous audiovisuals or visuals to exercise the eye muscles. This device is not only limited to finding the eye's audiovisual and/or visual capabilities but also includes programmed to exercise eye muscles of the user.

In an embodiment, an exercise method is developed by using an electronic device that exercise the eye through-out in its focal length; and audiovisuals or visuals at an angle. The audiovisuals or visuals includes but not limited to the use of smaller bigger numbers, words, alphabets and objects. The electronic device also monitors the response of a user to conclude if the exercise is being done efficiently or not. The biggest advantages of designing the present exercise are to increase the range of the user's current focal capability range and widen it as user's eyesight improves with exercise of eye's muscles. The progress & participation is monitored by taking input from the user but not limited to in a form of multiple choice, verbal response or touch input.

In another embodiment, the light is changed from one intensity to other i.e. using different intensities to exercise the diaphragm. For example-different intensity light is changed from dark to intense and then again back to dark and providing audiovisuals or visuals within for the user to identify and response.

In an embodiment, in addition a use of VR set can be done to show a larger and smaller object/font on the screen. In addition, use of VR can be done with fluctuate the screen light or flash-light intensity abruptly. A VR heads are that one kind utilizes head-mounted display device, the external vision of people and the sense of hearing are closed, and guiding user produces a kind of sensation in virtual environment. Its displaying principle is that left and right screen shows right and left eyes image respectively, and human eye obtains this with producing third dimension in brain after discrepant information. The VR device using the application performs the exercise method.

In an embodiment, the user needs to complete the test by seeing half the question on first screen and other half part of the question on second screen which is far from the first screen and answering the full question on phone's screen. For example, a multiplication of 2*50 wherein, 2 is given on the first screen and *50 is given on the second screen. So here the user needs to multiply 2*50 and put the answer which is 100 on his phone's screen. By performing the exercise user confirms participation in this exercise, wherein repetition of the method helps provide little workout to the user's eye muscles that help focus, move eye ball, diaphragm muscles to control incoming light and neck muscles.

In another embodiment, the tasks incudes but not limited to history, math and science. These tasks also increase user's knowledge and make user's brain functional, active and updated.

In an embodiment of the present invention, an application is provided to get access to the exercise method. A subscription is given to the user by subscribing the application a user can get access to the exercise method and in case the user does not perform the given task then a penalty will be charged. By doing so revenue is generated and the user will strictly follow the tasks and improve the eyesight or wise versa wherein the charges billed are based on the time the user uses one of the three embodiments for eye exercises discussed here. The subscription also can have a flat monthly charges to be enrolled in the exercising wherein the enrollment enables the user to use one of the three exercising method discussed.

As mentioned, there remains the foregoing description of the specific embodiments that will fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims. Every embodiment discussed here can process the user response at a local processor and/or server and/or through transmitting the data and/or a result over the internet. Every embodiment of exercises shown here, the user can be given an instructions in advance or whole displaying the first audiovisual or visual, wherein the response by the user is based on the instruction provided. Also the exercising method may not need to provide any instructions if the user is anticipated to identify illustrated audiovisual or visual. The visual also may have instruction that is verbal or within the displayed visuals. The user response in any of the three embodiments can be processed in on the same electronic screen being part of the exercising steps or an electronic device that is paired to the all electronic screens used in the exercise to process the user's response with the database and confirm if the user's response matches to the anticipated response, which also confirms the user's participation in the eye exercising activity. In the advanced system, the font size or visual scale is memorized for the specific user and the user's focal capabilities can be challenged by providing visuals that challenges user's focus capability range. A mobile device paired with an electronic screen or television can be used, wherein the mobile device does all the processing and transferring of the data over the internet while the electronic screen is used by the mobile device to display at least one of the audiovisual or visual. The exercising steps, visuals to be shown, responses to be anticipated, etc can be stored on the electronic device and/or can be streamed through internet as needed. Each of the three embodiments of this exercise can be configured to be performed online, offline or both. Also a user profile can be set up to keep memory of user's focal range data so the user don't need to adjust the size and/or scale and/or zoom of each or one or both of the two audiovisuals or visuals every time the user starts exercising using the above method. This method also can be used for kids or office workers wherein kids need to exercise for certain period of time everyday in order to continue using the tablet or electronic device forcing the kid to keep the eye muscles strong and active at scheduled time intervals. The exercise can be performed by using an application on a mobile device and linking it to a secondary screen, wherein the secondary screen can be a TV, monitor or any screen capable of linking and work in co-junction with the application online and/or offline.

The method can be use at least one of the electronic device that acts as a server or a server linked to each of the electronic device being used in the interrogation. The displays of each of the electronic device taking part in exercise are synchronised or linked to the server. The pairing between two electronic devices to one another and/or to the server can be established using a network, wifi, Bluetooth, internet and any other means of wireless or wired pairing. If a single electronic device is being used, the electronic device or its display can be paired to the server using an internet, wifi, Bluetooth any other means of wireless pairing.

Based on the user's response the electronic device is coordinating the gazing of the user's eyes to the at least one display. The electronic device used in this exercising method providing the user means of input that the system is generating options that queries/interrogations and allows the user to provide correct response. In other embodiment where a user is given a multiple choice selection on the first (closer) display where the user responses in form of visual or audio visual or text in response to the visual or audio visual or text on the second screen that is far away. Both screens are paired with one another to provide confirmation of the user's response in relation to the displayed audio visual or visual. Both screens also can be paired through internet to provide confirmation of the user's participation. A server can be used as a database to send visuals or audio visuals to the second screen and to monitor response entered from the first screen in response to the visual and the audio visual of the second screen. The server also can keep data for each user by registration details of that user in the database. This method causing server to validate a user's response on a first (close) electronic computing device in relation to a visual/audio visual, from database, illustrated on a second computing device screen (far screen). Both of the first and the second computing devices are paired with one another via server or one or both of the electronic devices acts as a server collaborating and confirming visual/audiovisuals to confirm the user participation. In another embodiment, a server can be independent and both electronic devices are connected to the server via internet, where the server causes the second screen (far away) to display a visual or an audio visual and causes second screen to provide response based on the visual or the audio visual of the second screen, where a user provides input on the first screen, causes the first screen device to forward the response. The server then compares the user's response with the visual or the audio visual of the second screen and provides confirmation of the user participation. In another embodiment, the second or the first screen computing device acts as a server and forces the other device to perform the same task as described in previous embodiment.

All the embodiments mentioned in this invention also can be used to determine health of user's eyes. It also can be determined to testing the user's eye sight to determine if the user needs eye glasses or eye glasses changed (based on user's capability to response to these exercises). The user also can be given a health score that shows health number based on user's improvements into advanced exercises. These embodiments also can be used to advise the user to have comprehensive eye exam performed of health of the user's eye falls short of pre-determined health number range. The mobile application used for these exercises also can refer to location close to the user for comprehensive eye exam if the application finds the user's eye health score deteriorating. This mobile application also can be used to refer to online website for to find eye prescription glasses for the user to purchase. This exercising method also can collect the user's data and share it with local or online eye exam/eye glasses retailer so they can provide the user offers available.

The invention claimed is:

1. An eye exercising method comprising:

allowing at least two electronic screens, positioned at different proximities from a user and/or displaying visuals at different scales, connected to a database to be used in the eye exercise method;

displaying at least one audiovisual or visual at least on a first of the at least two electronic screens, wherein the at least one audiovisual or visual corresponds to at least one of numerical and/or textual and/or alphabetic and/or object-based;

receiving a user response using at least one of the following;

a. a camera focused on the user's eyes;

b. a microphone for verbal input;

c. a touch input through a touch screen; and/or d. a touch-based paired accessory capable of receiving input;

wherein the user response is received through a second of the at least two electronic screens, and wherein the response corresponds to at least one of numerical, textual, alphabetic, or object-based content;

comparing the user's response to an anticipated response and generating a result based on the user's response, wherein the anticipated response is based on the audiovisual or visual presented.

2. The eye exercising method as claimed in claim 1, wherein the method used to exercise the user's eye muscles responsible for eyeball movements and/or focal movements and/or diaphragm movements.

3. The eye exercising method as claimed in the claim 1, wherein the at least one of the at least two electronic screens is a tablet and/or a mobile phone and/or a television and/or an electronic screen.

4. The eye exercising method as claimed in claim 1, wherein the user needs to focus at one of the at least two audiovisuals or visuals, or at the at least two audiovisuals or visuals, to respond to the interrogation.

5. The eye exercising method as claimed in claim 1, wherein the eye exercising method is conducted using an application and/or web-connectivity.

6. The eye exercising method as claimed in claim 1, wherein the involvement of the user is monitored and/or evaluated using the internet.

7. The eye exercising method as claimed in claim 1, wherein the user's involvement is monitored by providing the user at least one puzzle, wherein the brightness or contrast of each of the at least two screens varies, wherein the user needs to focus on each of the at least two audiovisuals or visuals to solve.

8. An eye exercising method comprising:

allowing at least one electronic screens, displaying visuals at different scales, connected to a database for use in the eye exercising method;

displaying at least two audiovisuals or visuals on the at least one electronic screen, wherein the audiovisuals or visuals are displayed simultaneously and/or in series, wherein at least one of the audiovisuals or visuals is smaller in scale than another, and wherein each audiovisual or visual corresponds to at least one of numerical, textual, alphabetic, or object-based content;

receiving a user response using a camera and/or a microphone and/or a touch screen and/or touch-based paired accessory capable of receiving input, wherein the response corresponds to at least one of numerical, textual, alphabetic, or object-based content;

comparing the user's response to an anticipated response and generating a result based on the comparison, wherein the anticipated response is derived from at least one of the at least two audiovisuals or visuals displayed.

9. The eye exercising method as claimed in claim 8, wherein the method is used to exercise the user's eye muscles responsible for eyeball movements and/or focal movements and/or diaphragm movements.

10. The eye exercising method as claimed in claim 8, wherein the at least one electronic screen is a virtual reality device and/or a tablet and/or a mobile phone and/or a television and/or an electronic screen.

11. The eye exercising method as claimed in claim 8, wherein the user needs to focus at one of the at least two audiovisuals or visuals, or at the at least two audiovisuals or visuals, to respond to the interrogation.

12. The eye exercising method as claimed in claim 8, wherein the exercise is conducted on a software application and/or using web-connectivity.

13. The eye exercising method as claimed in claim 8, wherein the involvement of the user is monitored and/or evaluated using the internet.

14. An eye exercise method comprising:

allowing an electronic screen of a virtual reality device, connected to a database, to be used in the eye exercise method;

displaying a first audiovisual or visual on the electronic screen, wherein the first audiovisual or visual corresponds to at least one of numerical, textual, alphabetic, or object-based content;

optionally receiving a user response to the first audiovisual or visual through at least one of eye-tracking, verbal input, or touch-based input;

displaying a second audiovisual or visual on the electronic screen, wherein the second audiovisual or visual differs from the first in scale, zoom ratio, or font size;

receiving a user response to the first audiovisual or visual, and/or the second audiovisual or visual through at least one of eye-tracking, verbal input, or touch-based input, wherein the response is based on:

(a) the first audiovisual or visual alone;

(b) the second audiovisual or visual alone; or (c) a combination or interpretation of both the first and second audiovisuals or visuals;

generating a result based on the user response and an anticipated response, wherein the anticipated response is derived from at least one of the audiovisuals or visuals presented.

15. The eye exercising method as claimed in the claim 14, wherein the at least two audiovisuals or visuals are displayed simultaneously and/or in-series.

16. The eye exercising method as claimed in claim 14, wherein the eye exercising method is conducted using an application and/or web-connectivity.

17. The eye exercising method as claimed in claim 14, wherein the involvement of the user is monitored and/or evaluated using the internet.

18. The eye exercising method as claimed in claim 14, wherein the user's involvement is monitored by providing the user at least one puzzle, wherein the brightness and/or contrast of the first electronic screen varies from the brightness and/or contrast of the second electronic screen, wherein user needs to focus on each of the at least two audiovisuals or visuals to solve.

* * * * *